Dec. 30, 1952

D. G. C. HARE 2,623,952

MODULATING SYSTEM

Filed April 1, 1950

INVENTOR
DONALD G. C. HARE
BY
[signature]
ATTORNEY

Patented Dec. 30, 1952 2,623,952

UNITED STATES PATENT OFFICE 2,623,952

MODULATING SYSTEM

Donald G. C. Hare, Stamford, Conn., assignor to Magnetic Equipment, Inc., Greenwich, Conn., a corporation of Delaware Application April 1, 1950, Serial No. 153,471

7 Claims. (Cl. 179—100.1)

The present invention relates to frequency modulation systems and comprises a novel system of this type which, although of general application, is of particular value for use in magnetic sound recording and reproducing systems.

The frequency modulation system of the present invention when used in magnetic sound transducing systems permits the use of a carrier frequency near the upper frequency limit imposed by the recording gap width and signal track carrier speed without impairment of quality or suppression of modulating frequencies. Briefly, the invention eliminates the necessity for swinging above the carrier frequency by providing two channels and two modulators each swinging the carrier frequency in the same direction, namely down, the modulations in the two channels corresponding to opposite half cycles of the signal wave. In reproduction, the outputs of the two recorded channels are fed to circuits having suitable frequency amplitude characteristics and are then rectified and combined. In this manner frequencies above the carrier frequencies are not recorded and yet the signal is faithfully reproduced.

For a better understanding of the invention reference may be had to the accompanying drawing, of which:

Figures 1, 2, 3:
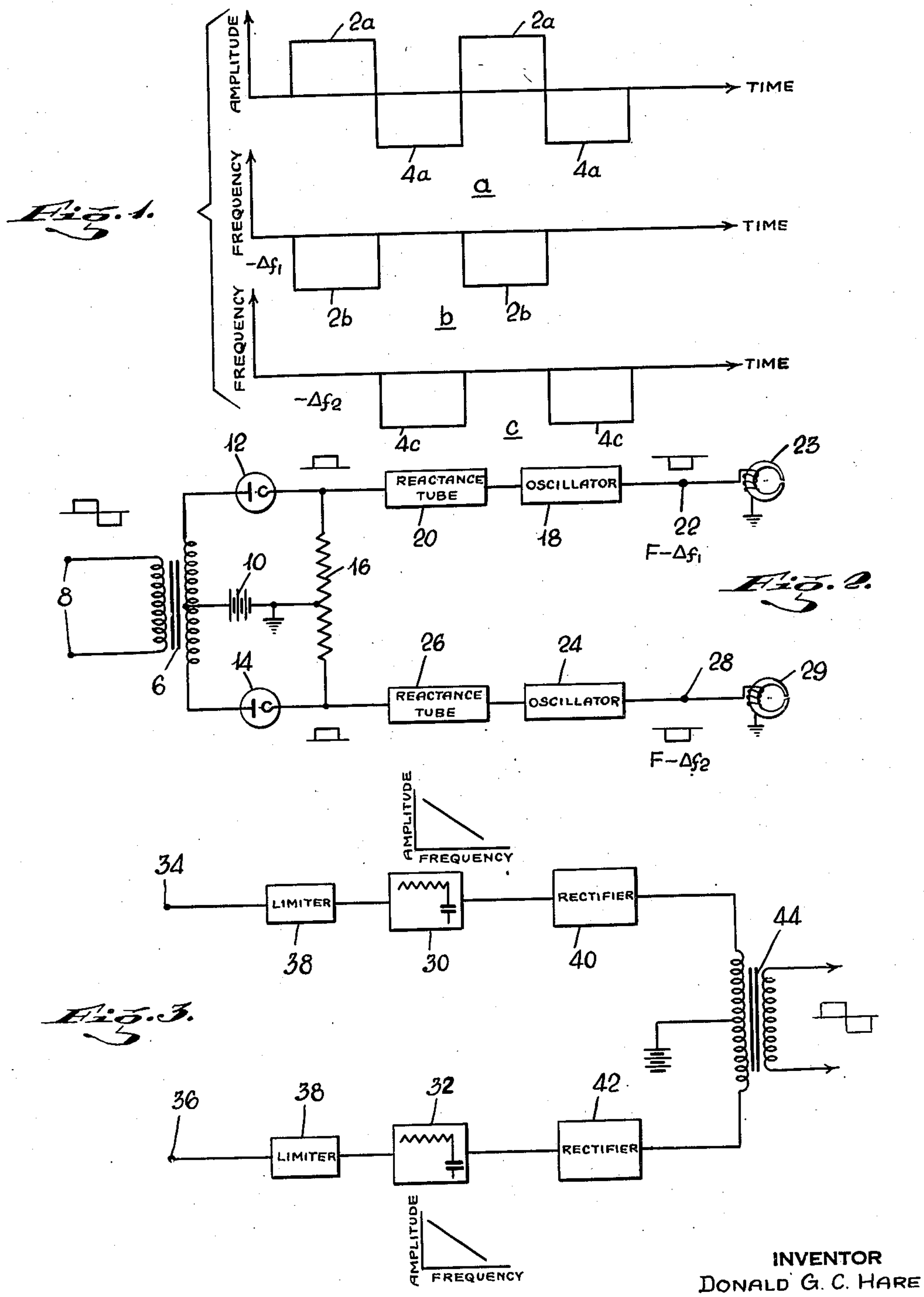
Fig. 1 is a series of graphs explanatory of the invention.
Figs. 2 and 3 are diagrams of recording and reproducing circuits, respectively, of a system embodying the invention.

In Fig. 1 two cycles of a signal to be recorded and reproduced are indicated diagrammatically at *a*, a square wave form being illustrated for simplicity. In accordance with the invention, the positive half cycles of the signal wave, indicated at 2*a*, frequency modulate an oscillator to swing the oscillator frequency in the negative direction with increasing amplitude of the signal, as indicated at *b* in Fig. 1 wherein 2*b* indicates the frequency swings $-\Delta f_1$, of the carrier resulting from modulation by the half cycles 2*a*. The opposite half cycles of the signal, indicated at 4*a*, similarly frequency modulate a carrier to produce a second frequency modulated wave, indicated at *c* in Fig. 1, wherein the frequency deviations, $-\Delta f_2$, corresponding to the half cycles 4*a* of the signal, are indicated at 4*c*. The two frequency modulated waves may then be recorded on separate tracks, the highest frequency recorded in each being that of the carrier.

A suitable circuit for producing the two frequency modulated waves for separate recording and a circuit for reproducing the signal from such separate recordings are shown diagrammatically and symbolically in Figs. 2 and 3 to which reference may now be had.

In Fig. 2, the transformer 6 has its primary connected to input terminals 8 upon which is impressed a signal to be recorded and reproduced.

The signal is diagrammatically indicated above the terminals 8 as of the form shown at *a* in Fig. 1. The secondary winding of transformer 6 has its mid-point connected to ground through a source 10 of direct current. One end of the secondary winding of transformer 6 is connected to the anode of a diode 12 and the other end of the secondary winding is connected to the anode of a second diode 14. A center grounded resistor 16 connects the cathodes of the diodes. Thus diode 12 passes the positive half cycles of the signal, as indicated symbolically in the drawing and diode 14 passes the negative half cycles of the signal.

An oscillator 18, the frequency of which is controlled by the output of diode 12 through the intermediary of a reactance tube 20, is connected to an output terminal 22 for the delivery thereto of the frequency modulated voltage wave corresponding to that indicated at *b* in Fig. 1. Similarly an oscillator 24 has its frequency controlled by the output of diode 14 through the intermediary of a reactance tube 26 so as to deliver a frequency modulated voltage wave of the form indicated at *c* in Fig. 1 to a second output terminal 28. The output from terminal 22, may be connected directly or through suitable amplifiers and low pass filters to a recording device or head 23 for recording one part of the signal, and the output from terminal 28 may be connected to another recording device 29 for recording the other part of the signal.

The reproducing circuit of Fig. 3 includes networks 30 and 32 connected respectively to input terminals 34 and 36 through suitable amplitude limiters 38. Terminal 34 may be assumed to be connected to a pick-up device or head for the recording made by head 23 and terminal 36 may be assumed to be connected to a pick-up device or head for the recording made by head 29. The networks 30 and 32 are designed to have an amplitude-frequency response such as indicated symbolically above the networks, that is, a substantially linear characteristic which decreases with increase of frequency. Any conventional networks of this type may be employed. Such networks ordinarily include filter sections in which the series branches are mainly resistive and the shunt branches capacitative as indicated in the drawing.

A detector or rectifier 40, which may be a simple diode, is connected to the output of network 30 and a similar detector or rectifier 42 is connected to the output of network 32. Detectors 40 and 42 are connected to opposite ends of the primary winding of an output transformer 44, the mid-point of the primary being grounded. With the above described circuit, the two frequency modulated carriers are combined and rectified to yield the signal in an output circuit connected to the secondary of the output transformer 44. Thus when a loud speaker or other transducing device, with or without intermediate amplifiers, is connected to the output circuit, a low frequency signal varying in amplitude with the signal impressed on the input terminals of the recording circuit is delivered to the transducing device and yet no frequencies recorded in either channel exceed the frequency of the unmodulated carrier.

The advantages of the above described system as applied to magnetic recording will be apparent. By recording a signal as frequency modulation of a carrier, recording and reproduction is made independent of the non-linear amplitude response of magnetic tape or wire and uniform output throughout the frequency range of the signal is obtained. By recording opposite half cycles of the signal in separate channels as unidirectional frequency excursions of a carrier, relatively high carrier frequencies may be employed without exceeding the upper frequency limit of the recording medium. Obviously various changes in the particular system disclosed could be made without departing from the spirit of the invention as defined in the accompanying claims. For example, although in the particular reproducing system hereinbefore described, the detection or demodulation is directly effected upon pick-up from the signal track carrier, the frequency modulated carriers could, if desired, be first mixed with higher frequencies in order to prevent frequency excursion of the carrier into the audio frequency range. Also instead of using frequency discriminating networks having similar amplitude frequency characteristics in the reproducing circuit with the outputs of the rectifiers connected in opposition, as in the illustrated embodiment, discriminating networks having inverse amplitude-frequency characteristics could be employed, in which case, of course, the outputs of the rectifiers would be connected directly together, or a single rectifier could be employed. Types of frequency modulation other than that employing reactance tubes and variable frequency oscillators could be used in the recording circuit as will be apparent to those skilled in the art.

The following is claimed:

1. The method of recording and reproducing signals on a signal track which comprises converting a signal into two frequency modulated complementary waves, separately recording the downward frequency excursions of the two modulated waves on the track, separately picking up each recording and recovering the modulating energy and finally combining the modulating energy to reproduce the low frequency signal.

2. The method of recording and reproducing a low frequency signal which comprises separating opposite half cycles of the signal, recording in two channels the lower side bands of carriers frequency modulated with the separated opposite half cycles of the signal, picking up the recording from each channel, separately detecting the modulation therein and combining the detected modulating energy to reproduce the low frequency signal.

3. The method of recording and reproducing low frequency signals which comprises frequency modulating a carrier with alternate half cycles of the signal energy, recording the downward excursions of the modulated carrier in one channel, frequency modulating a carrier with the other alternate half cycles of the signal and recording the downward excursions in a second channel, picking up the recording and detecting the modulating energy from each channel and combining the recovered modulating energy to produce an output signal.

4. A system for recording and reproducing a low frequency signal which comprises means for dividing the signal into two components of opposite sign, a source of high frequency energy means controlled by one component of the signal for frequency modulating high frequency energy from said source in a downward direction only, means for recording such frequency modulated energy in one channel, means controlled by the other component of the signal for frequency modulating high frequency energy from the said source in a downward direction only, means for recording such last mentioned frequency modulated energy in a second channel, means for picking up the recording from each channel and for recovering the modulating energy therefrom and means for combining the recovered modulating energy into a low frequency output signal.

5. A system for recording a low frequency signal which comprises two circuits each comprising an input terminal, a one-way current conducting device, a frequency modulator and a recording device arranged in series, whereby when a low frequency signal is impressed across said input terminals opposite half cycles of the signal are passed by said one-way devices to the frequency modulators, a source of high frequency energy associated with said frequency modulators, and means for suppressing frequency excursions above the carrier frequency whereby said recording devices receive frequency modulated energy from said circuits for separate recording of two signals each corresponding to a part only of the signal impressed on said input terminal.

6. A system for reproducing a signal recorded by the recording system of claim 5 which comprises a pair of networks each having a sloping substantially linear amplitude frequency characteristic and each responsive to energy picked up from a different one of said recordings, and means for rectifying and combining the energy passed by said networks for reproduction of the signal impressed on the input terminals of the recording circuits.

7. A recording and reproducing system comprising in combination means for separating a signal to be recorded into two parts each corresponding to alternate half cycles of the signal, means for separately recording each part of the signal as frequency modulation of a carrier with the carrier frequency swung downwardly only, means for picking up and discriminating each recording and means for combining the detected energy for reproduction of the signal.

DONALD G. C. HARE.

REFERENCES CITED

The following references are of record in the file of this patent:

UNITED STATES PATENTS

| Number | Name | Date |
|---|---|---|
| 2,036,918 | Luck | July 13, 1937 |
| 2,389,356 | Goldstine | Nov. 20, 1945 |
| 2,426,225 | Krause | Aug. 26, 1947 |
| 2,451,430 | Barone | Oct. 12, 1948 |

FOREIGN PATENTS

| Number | Country | Date |
|---|---|---|
| 605,060 | Great Britain | July 15, 1948 |